July 12, 1960
O. H. WINN
2,945,179
ELECTRICAL MEASURING ARRANGEMENT
Filed Dec. 23, 1953
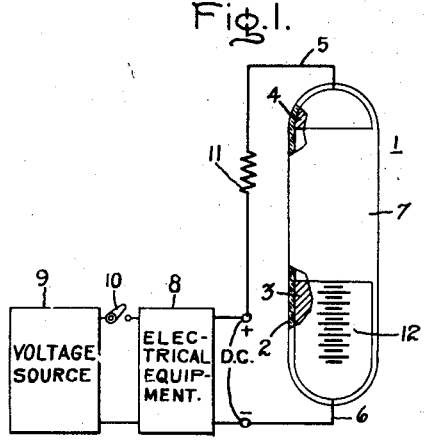
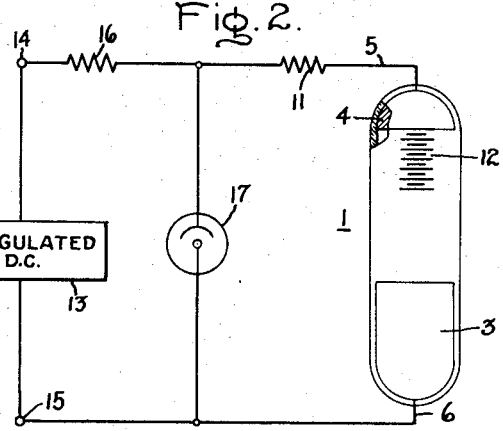
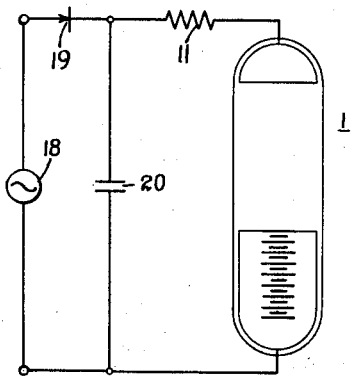
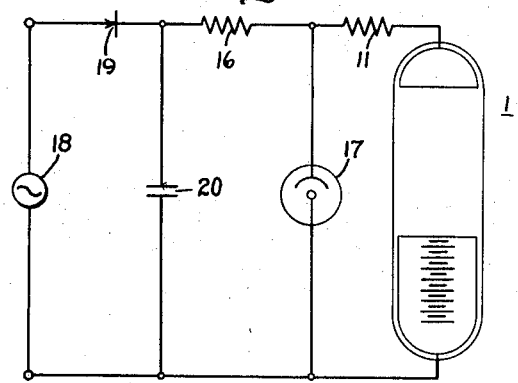
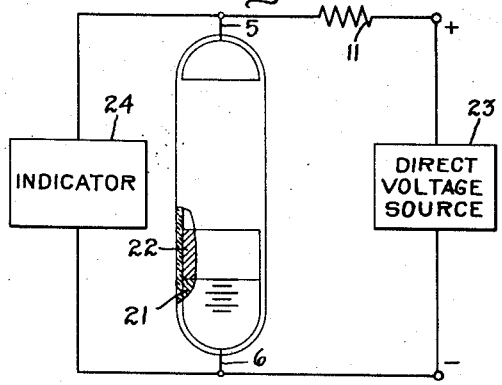
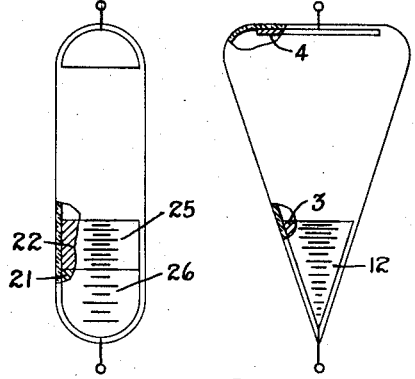
Inventor:
Oliver H. Winn,
by Charles M. Hutchins
His Attorney.

United States Patent Office 2,945,179
Patented July 12, 1960

2,945,179

ELECTRICAL MEASURING ARRANGEMENT

Oliver H. Winn, Whitesboro, N.Y., assignor to General Electric Company, a corporation of New York Filed Dec. 23, 1953, Ser. No. 399,921

16 Claims. (Cl. 324—68)

This invention relates to measuring devices, and particularly to the type adapted to derive the time integral of an applied signal.

There exists a need in industry for an inexpensive and reasonably accurate device for measuring the integral of an applied signal or for producing a signal when a predetermined integral value is obtained. For example, in the electrical and electronic industry an instrument with these characteristics is particularly needed to measure the total operating time of an electrical apparatus. The existing mechanisms for serving this purpose generally have been found to be bulky and expensive.

It is therefore an object of this invention to provide an improved signal indicating device.

Another object of the invention is to provide an improved signal integrator.

Another object of this invention is to provide an improved arrangement for measuring time as the integral of a related constant current flow.

Another object of this invention is to provide an improved arrangement for indicating when a product of time and current flow in an electrical circuit reaches a predetermined value.

Another object of this invention is to provide a reversible integrator of low cost.

Another object of this invention is to provide an improved arrangement for indicating the total operating time of an electrical equipment.

In a particular application of the invention to measuring the hours of operation of electrical equipment, a vessel containing a pair of electrodes immersed in an electrolytic solution is employed as an electrical hourglass. The electrodes are connected to a constant current source only during the period the equipment is being operated. Time is measured by indirectly measuring the change in length of one of the electrodes due to the electrochemical plating phenomena established during the periods the electrodes are energized from the current source.

The features of the present invention which are believed to be characteristic of my invention are set forth with particularity in the appended claims. My invention, itself, however, together with further objects and advantages thereof can best be understood by reference to the following description taken in connection with the accompanying drawings in which:

Fig. 1 is a schematic representation, partly in section, of one embodiment of the invention in which the decrease in length of an electrode is measured to obtain the total operating time of an electrical equipment.

Fig. 2 is a similar representation illustrating another embodiment of the invention wherein the amount of material plated on an electrode is measured to indicate an elapse of time, and voltage regulating device employed to obtain the desired constant current operating conditions.

Fig. 3 is another representation illustrating a further embodiment of the invention permitting operation from an alternating voltage source.

Fig. 4 represents an embodiment of the invention permitting operation from an unregulated alternating voltage source.

Fig. 5a represents an embodiment of the invention applicable to situations where a coarse-fine indication of total operating time is desired.

Fig. 5b represents an embodiment of the invention utilizing an electrode of non-uniform cross-section for obtaining non-linear indications of elapsed time.

Fig. 6 represents an embodiment of the invention employing two dissimilar materials for one of the electrodes.

Referring to Fig. 1 there is shown one embodiment of the invention in the form of a thermometer-like meter, comprising a tube 2 formed of a non-conductive, visually transparent material such as glass. A first electrode 3 is fitted or sealed across one end of the tube and a second electrode 4 is sealed across the other end. External leads 5 and 6 are provided for the electrodes, as for example by sealing through the glass. An electrolytic solution 7 occupies the space between the electrodes. The materials comprising the electrodes and the electrolyte are selected such that in the absence of a closed external circuit between the electrodes, as for example by connecting a voltage source across these electrodes, no appreciable electrolytic action is established. In one embodiment the material comprising electrodes 3 and 4 is silver, and that of the solution 7, silver nitrate. It is obvious that other known conductor and electrolyte combination may be employed. When the device described thus far is connected to a source of direct current, an amount of the material comprising electrode 3 is removed and deposited onto the other electrode 4. The amount removed or deposited is proportional to the time integral of the current flow caused by an external direct current source.

To measure the total time an electrical equipment such as 8 is connected to a voltage source 9 by means of switch 10, the meter 1 is connected through a current limiting resistor 11 to a source of direct voltage contained within equipment 8. Thus whenever equipment 8 is energized from source 9 by closing switch 10, the direct current source within 8 is also energized. Energization of meter 1 thereupon causes electrode material from 3 to be plated onto electrode 4. Depending upon the amount of time the equipment 8 is connected to the source 9, a corresponding amount of electrode material will be removed from electrode 3, thereby reducng its length. Markings 12 made on the glass tube 2 give an indication of the amount of material removed from electrode 3, and therefore also the time the equipment 8 has been operating. The markings may be in the form of graduations etched into the wall of the glass tube 2, a marked label applied to the glass, or markings on the electrode itself. In the first two mentioned cases the measurement is made by comparing the markings with the length of electrode remaining, while in the latter case the markings in the electrode would be gradually removed during the electrolytic action process and the remaining graduations would indicate the total time of operation.

In the arrangement of Fig. 1 it was assumed that the direct voltage source available within 8, and to which the meter 1 is connected is a constant voltage source or one whose amplitude variations are tolerable. The current limiting resistor is made of sufficiently large resistance value with respect to the internal resistance of meter 1 such that it can be considered that the current flow through the meter is sufficiently constant during any electrolytic action. The voltage source 9 may be either of the alternating or direct voltage type. If of the direct voltage type, then by internal connections made in equipment 8, the meter may be connected directly to the voltage source 9. Or, if 9 is an alternating voltage source, and any available direct voltage circuits contained within 8 are undesirably variable because of equipment operating instabilities, a separate rectifier circuit may be provided for the meter within 8 to be energized from 9 simultaneously therewith.

Fig. 2 illustrates an arrangement wherein the amount of material deposited onto an electrode is used to provide accumulated time information. Wherever possible, identical symbols are retained throughout the remaining drawings in describing similar elements in order to simplify the explanation of the invention. Thus in Fig. 2 when a voltage is applied to leads 5 and 6, in a manner to be described shortly, the material from electrode 3 is removed and deposited onto electrode 4. Graduations 12 now indicate the total increase in length of the electrode 4 and therefore the total time that voltage has been applied to leads 5 and 6. The meter of Fig. 2 has been modified to operate from an unregulated direct voltage source 13 which would be connected to terminals 14 and 15. The unregulated direct voltage is applied across resistor 16 and the voltage regulator tube 17 in series. Voltage regulator tube 17 may be of the gaseous type, such as the commercial tube type VR105, adapted to alter its own internal impedance in accordance with any variation of the applied voltage and thereby maintain a constant voltage drop across its terminals. The constant voltage developed across regulator tube 17 is applied through the current limiting resistor 11 to the meter 1 in a manner similar to that described in connection with Fig. 1.

Fig. 3 shows an arrangement whereby the constant current for meter 1 is derived from an alternating voltage source 18. The alternating voltage from 18 is rectified by 19 and developed across condenser 20. Condenser 20 filters the rectified alternating voltage such that a sufficiently constant direct voltage is available across its terminals. It of course is assumed that the alternating voltage source 18 is constant or tolerably so. The direct voltage developed across condenser 20 is applied through resistor 11 to meter 1 which then operates in the manner previously described.

Where the alternating voltage source 13 is intolerably variable, the arrangement of Fig. 4 may be used. Here the rectified voltage available across condenser 20 is applied to the series connected resistor 16 and voltage regulator tube 17 which operate in a manner similar to that described in connection with Fig. 2 to supply a constant current through resistor 11 to meter 1.

Fig. 6 illustrates an arrangement for deriving a signal when a predetermined amount of time has elapsed. For example, it is often desired that a visual or sound alarm become operative when a given operating time has transpired. This is accomplished in the arrangement of Fig. 6 by making one of the electrodes, say 3 of two dissimilar materials, such that an abrupt change in potential occurs across 1 when material 22 is all removed by electrolytic action. In one embodiment, portion 21 comprises copper and portion 22 silver and the solution comprises silver nitrate. The electrode portions are sealed across the tube 2 such that the electrode portion 22 is removed first by electrolytic action before the electrode portion 21 may be removed. The voltage developed across meter 1 as the result of current flow from source 23 is also applied to an indicator 24 which may comprise an amplifier and a neon glow tube. Normally the voltage across the meter, and hence across indicator 24 is insufficient to cause the indicator to operate. However, as soon as the part of the first electrode portion 22 is removed, the voltage across the cell changes due to the dissimilar electrode metals. The consequent change in the voltage developed across 1 causes indicator 24 to become operative. For example, the neon glow tube is able to be biased within a few volts of its extinguishing point, such that a relatively small change in the voltage across meter 1 would cause it to conduct and become illuminated. A scale portion 12 is also provided to indicate total time beyond the indicating point of 24.

Fig. 5a illustrates an arrangement wherein a coarse and fine scale, 25 and 26 respectively, have been provided to provide closer time measurements near the maximum operating time period. The different scales are made possible by the use of two different materials 21 and 22 as previously mentioned with material 21 having the faster plating off rate.

Fig. 5b illustrates an arrangement wherein non-linear scale operation may be achieved by use of electrodes having a non-uniform cross-section. In this arrangement electrodes 3 comprises a conical shape such that the upper portion is removed by electrolytic action at a slower rate due to the increased area than is the lower portion. The effect of this arrangement is to produce more widely spaced and hence more easily readable graduations near the maximum operating time period for the equipment.

In the previous descriptions of the invention, certain shapes and compositions were assigned to materials employed in the apparatus embodying the invention in order to facilitate an understanding of its operation. It is understood however that such assignments have been made purely by way of example and are not to be construed in any way as limiting the scope of the invention.

While a specific embodiment has been shown and described it will be understood that various modifications may be made and developed without departing from the invention. The appended claims are therefore intended to cover any such modifications within the true spirit and scope of the invention.

What I claim is new and desire to secure by Letters Patent of the United States is:

1. A tubular vessel containing a separate length of electrode of like diameter fitted at each end, an electrolyte within said tube contacting only one surface of each of said electrodes, said electrodes and electrolyte comprising materials adapted to become electrolytically active in response to a current source being connected between said electrodes, said vessel containing graduated markings associated with one of said electrodes to indicate the amount of change in length thereof in response to an electrolytic action.

2. A vessel containing an electrolyte in contact with a pair of spaced electrodes, said electrodes and electrolyte comprising normally inactive materials adapted to become electrolytically active in response to an external current source being connected between said electrodes, a source of current connected between said electrodes, said current source being sufficiently constant to cause a dimention of one of said electrodes to change at a predetermined rate with time by electrolytic action, and means for indicating the amount of change in said dimension with time.

3. A tubular vessel containing a separate length of electrode at each end, an electrolyte within said vessel contacting said electrodes, said electrodes and electrolyte comprising normally inactive materials adapted to become electrolytically active in response to an external current source being connected between said electrodes, a constant current source, means connecting said source between said electrodes to cause a change in length of said electrodes by electrolytic action, said vessel containing graduated markings associated with one of said electrodes to indicate the amount of change in length thereof with time.

4. A vessel containing an electrolyte in contact with a pair of spaced electrodes, an effectively constant current source comprising a voltage source connected in series with a current limiting resistor between said electrodes to cause the lengths of said electrodes in said vessel to change because of the resultant electrolytic action, and a scale associated with one of said electrodes to indicate an accumulated change in its length.

5. A visually transparent, electrically non-conductive vessel containing an electrolyte in contact with a pair of spaced electrodes, said electrodes and electrolyte comprising materials adapted to respond to an external source of effectively constant current connected between said electrodes to cause the length of one of said electrodes to decrease because of the resultant electrolytic action, said one electrode comprising first and second portions, said portions comprising dissimilar materials having different rates of decrease of length for a given value of current flow, said electrode portions being positioned within said vessel such that the first portion is removed by electrolytic action before the second portion is able to be removed, and scale means associated with at least one of said portions for indicating the decrease in length thereof with time.

6. A visually transparent tubular vessel containing an electrolyte in contact with a separate length of electrode of like diameter fitted at each end of said vessel, said electrolyte being in contact with only one surface of each of said electrodes, said electrodes and electrolyte comprising normally inactive materials adapted to become electrolytically active in response to a current applied between said electrodes to cause the lengths of said electrodes to change, and scale means associated with at least one of said electrodes for indicating the change in its length due to electrolytic action, said one electrode comprising a uniform cross section along its length enabling its length to change at a constant rate for a given value of current flow.

7. An arrangement for indicating the duration of an operative condition comprising a vessel containing an electrolyte in contact with two spaced electrodes, said electrolyte and electrodes comprising materials having a characteristic property which is adapted to change in response to an external current source being connected between said electrodes, a constant current source, means for externally connecting said source between said electrodes for the duration of said operative condition to cause a quantitative change in said characteristic property, and means responsive to a change in length of one of said electrodes for indicating the amount of said quantitative change.

8. An arrangement for indicating the duration of an operative condition comprising a vessel containing an electrolyte in contact with two spaced electrodes, said electrolyte and electrodes comprising materials such that the length of one of said electrodes is caused to change by electrolytic action in response to an external current source being connected between said electrodes, a constant current source, means for externally connecting said source between said electrodes for the duration of said operative condition to cause a change in the length of said one electrode, and means for indicating the amount of said change.

9. An arrangement for indicating the duration of an operative condition comprising a vessel containing an electrolyte in contact with a pair of spaced electrodes, said electrodes and electrolyte comprising normally inactive materials adapted to become electrolytically active in response to an external current source being connected between said electrodes, a current source, means for connecting said last named source between said electrodes for the duration of said operative condition, said last named current source being sufficiently constant to cause a dimension of one of said electrodes to change at a fixed rate with time by electrolytic action, and means for indicating the amount of change in said dimension with time.

10. An electrically non-conductive vessel containing an electrolyte in contact with a pair of spaced electrodes, a source of effectively constant voltage and a current limiting resistor connected in series across said electrodes to cause the length of one of said electrodes to decrease because of the resultant electrolytic action, said one electrode comprising first and second portions, said portions comprising dissimilar materials having different rates of decrease of lengths for a given valve of current flow, said electrode portions being positioned within said vessel such that the first portion is removed by electrolytic action before the second portion is able to be removed, and means responsive to the resultant change in voltage between said electrodes when said second portion is being removed for providing an indication thereof.

11. A visually transparent, electrically non-conductive vessel containing an electrolyte in contact with a pair of spaced apart electrodes, a source of effectively constant voltage and a current limiting resistor connected in series across said electrodes to cause the length of one of said electrodes to decrease because of the resultant electrolytic action, said one electrode comprising a non-uniform cross-section such that its length is decreased at a non-uniform rate with time for a given value of current flow, and scale means associated with said one electrode for indicating the decrease in length thereof with time.

12. A tubular vessel containing a separate length of electrode at each end, an electrolyte within said vessel contacting said electrodes, said electrodes and electrolyte comprising normally inactive materials adapted to become electrolytically active in response to a current applied between said electrodes, a rectifier and current limiting resistor connected in series with said electrodes, a condenser connected across the series connection of said resistor and electrodes, and a scale associated with one of said electrodes to indicate a change in its length due to electrolytic action.

13. An arrangement comprising a tubular vessel containing a separate length of electrode fitted at each end, an electrolyte within said vessel contacting said electrodes, said electrodes and electrolyte comprising normally inactive materials adapted to become electrolytically active in response to a current applied between said electrodes, a current limiting resistor, a constant current gaseous discharge device connected in series with said current limiting resistor across said electrodes, means for applying a current source across said device, and a scale associated with one of said electrodes to indicate a change in its length due to electrolytic action.

14. A vessel containing an electrolyte in contact with two spaced electrodes, said electrolyte and electrodes comprising materials such that the length of one of said eletrodes is adapted to be removed by electrolytic action in response to an external current source being connected between said electrodes, said one electrode comprising two portions, said portion having different rates of decrease of length for a given value of current flow, such portions being positioned within said vessel such that the first portion is removed by electrolytic action before the second portion is able to be removed, and means for indicating the change in length of said portion.

15. A vessel containing an electrolyte in contact with two spaced electrodes, a direct current source connected between said electrodes, said electrolyte and electrodes comprising materials such that the length of one of said electrodes is adapted to be removed by electrolytic action in repsonse to the current flow from said source, said one electrode comprising two portions, said portion having different rates of decrease of length for a given value of current flow, such portions being positioned within said vessel such that the first portion is removed by electroyltic action before the second portion is able to be removed, and means for indicating the change in length of said portion.

16. An elapsed time indicator comprising a container, a pair of electrodes of like diameter in spaced relationship supported by said container, an electrolyte enclosed in said container and in contact with only one surface of each of said electrodes, and scaling means adapted to indicate a change in length of at least one of said electrodes upon application of a unidirectional current therethrough.

References Cited in the file of this patent
UNITED STATES PATENTS

| | | |
|---|---|---|
| 282,428 | Weston | July 31, 1883 |
| 406,824 | Edison | July 9, 1889 |
| 475,411 | McKenna et al. | May 24, 1892 |
| 533,153 | Willard | Jan. 29, 1895 |
| 2,604,514 | Neil | July 22, 1952 |
| 2,642,478 | Lasky et al. | June 16, 1953 |
| 2,655,634 | Kroko | Oct. 13, 1953 |